United States Patent
Wang et al.

(10) Patent No.: US 12,423,524 B2
(45) Date of Patent: Sep. 23, 2025

(54) RECOGNITION METHOD AND ELECTRONIC DEVICE

(71) Applicants: HON HAI PRECISION INDUSTRY CO., LTD., New Taipei (TW); Foxconn Technology Group Co., Ltd., Guangdong Province (CN)

(72) Inventors: Jia Wang, New Taipei (TW); Jing-Cheng Ke, New Taipei (TW); Wen-Huang Cheng, New Taipei (TW); Hong-Han Shuai, New Taipei (TW); Yung-Hui Li, New Taipei (TW)

(73) Assignees: HON HAI PRECISION INDUSTRY CO., LTD., New Taipei (TW); Foxconn Technology Group Co., Ltd., Guangdong Province (CN)

( * ) Notice: Subject to any disclaimer, the term of this patent is extended or adjusted under 35 U.S.C. 154(b) by 241 days.

(21) Appl. No.: 18/349,183

(22) Filed: Jul. 10, 2023

(65) Prior Publication Data
US 2024/0013001 A1    Jan. 11, 2024

Related U.S. Application Data

(60) Provisional application No. 63/367,915, filed on Jul. 8, 2022.

(51) Int. Cl.
*G06F 40/295* (2020.01)
*G06V 30/146* (2022.01)
*G06V 30/19* (2022.01)

(52) U.S. Cl.
CPC .......... *G06F 40/295* (2020.01); *G06V 30/147* (2022.01); *G06V 30/19187* (2022.01)

(58) Field of Classification Search
CPC ........................................................ G06N 5/04
See application file for complete search history.

(56) References Cited

U.S. PATENT DOCUMENTS 11,443,120 B2 *  9/2022  Poddar .............. G06F 16/90332
11,455,788 B2 *  9/2022  Liu ..................... G06F 16/5846
(Continued)

OTHER PUBLICATIONS

Liu et al. "Cross-Modal Progressive Comprehension for Referring Segmentation". arXiv:2105.07175v1 [cs.CV] May 15, 2021 (Year: 2021).*

(Continued)

*Primary Examiner* — Jesse S Pullias
(74) *Attorney, Agent, or Firm* — CKC & Partners Co., LLC

(57) ABSTRACT

A recognition method includes the following steps. A text is analyzed by a language recognition network to generate an entity feature, a relation feature and an overall feature. An input image is analyzed by an object detection network to generate candidate regions. Node features, aggregated edge features and compound features are generated by an enhanced cross-modal graph attention network according to the entity feature, the relation feature, the candidate regions and the overall feature. The entity feature and the relation feature are matched to the node features and the aggregated edge features to generate the first scores. The overall feature is matched to the compound features to generate second scores. Final scores corresponding to the candidate regions are generated according to the first scores and the second scores.

12 Claims, 13 Drawing Sheets

(56) References Cited

U.S. PATENT DOCUMENTS

| | | | |
|---|---|---|---|
| 11,657,230 B2* | 5/2023 | Lee | G06T 7/10 |
| | | | 382/103 |
| 12,288,391 B2* | 4/2025 | Chen | G06V 10/82 |
| 2024/0289981 A1* | 8/2024 | Kuo | G06F 40/126 |

OTHER PUBLICATIONS

Yang et al. "Dynamic Graph Attention for Referring Expression Comprehension". 2019 IEEE/CVF International Conference on Computer Vision (Year: 2019).*

Changmeng Zheng et al., "Multimodal relation extraction with efficient graph alignment", MM '21: Proceedings of the 29th ACM international conference on multimedia, Oct. 20-24, 2021, pp. 5298-5306, Association for Computing Machinery, U.S.A.

* cited by examiner

Fig. 7

RECOGNITION METHOD AND ELECTRONIC DEVICE

RELATED APPLICATIONS

This application claims priority to U.S. Provisional Application Ser. No. 63/367,915 filed Jul. 8, 2022, the disclosures of which are incorporated herein by reference in their entirety.

BACKGROUND

Field of Invention

The disclosure relates to a recognition method. More particularly, the disclosure relates to a recognition method and an electronic device thereof capable for recognizing an object in an image according to an expression of a text.

Description of Related Art

In nowadays techniques of referring expression comprehension, some neural network architectures are designed for detecting a target region referred by a given text. This is a research hotspot in human-machine communication, visual question answering, image retrieval and visual dialogue techniques.

However, in the above-mentioned applications, it is still challenging to understand and decrease a gap between visual information and a variety of textual information of the text. And, the number of candidate regions output by an object detection network is far more than the number of entities in the corresponding language expression, which is a challenge to the referring expression comprehension.

Therefore, how to enhance the matching accuracy between an expression of a text and a target object in an image, and to eliminate the influence of irrelevant objects on the target object are important issues in this field.

SUMMARY

An embodiment of the disclosure provides a recognition method. The recognition method comprises the following steps. A text is analyzed by a text recognition network to generate an entity feature, a relation feature and an overall feature. An input image is analyzed by an object detection network to generate a plurality of candidate regions. A plurality of node features, a plurality of aggregated edge features and a plurality of compound features are generated by an enhanced cross-modal graph attention network according to the entity feature, the relation feature, the candidate regions and the overall feature. The entity feature and the relation feature are matched to the node features and the aggregated edge features respectively to generate a plurality of first scores. The overall feature is matched to the compound features to generate a plurality of second scores. A plurality of final scores corresponding to the candidate regions are generated according to the first scores and the second scores.

An embodiment of the disclosure provides an electronic device. The electronic device comprises a memory device and a processor. The processor is electrically coupled to the memory device. The processor is configured to execute the following steps. A text is analyzed based on a text recognition network, to generate an entity feature, a relation feature and an overall feature. An input image is analyzed based on an object detection network, to generate a plurality of candidate regions. A plurality of node features, a plurality of aggregated edge features and a plurality of compound features are generated, based on an enhanced cross-modal graph attention network, according to the entity feature, the relation feature, the candidate regions and the overall feature. The entity feature and the relation feature are matched to the node features and the aggregated edge features to generate a plurality of first scores. The overall feature is matched to the compound features to generate a plurality of second scores. The plurality of final scores are generated corresponding to the candidate regions according to the first scores and the second scores.

Summary, the aforesaid recognition method is to respectively match the entity feature and the relation feature of individual words to the node features and aggregated edge feature generated from the enhanced cross-modal graph attention network to generate the first scores, and the aforesaid recognition method matches the overall feature of the whole text to the compound feature generated from the enhanced cross-modal graph attention network to generate the second scores. To enhance the matching accuracy between the expression of the text and the actual position in the image, the first scores and the second scores are calculated, respectively. The first scores and the second scores are used to calculate the final scores which correspond to the candidate regions.

BRIEF DESCRIPTION OF THE DRAWINGS

The disclosure can be more fully understood by reading the following detailed description of the embodiment, with reference made to the accompanying drawings as follows:

FIG. 7 is a schematic diagram illustrating outcomes of the neural network architecture configured with different numbers of reasoning steps according to some embodiments of the present disclosure.

DETAILED DESCRIPTION

Figure 1:
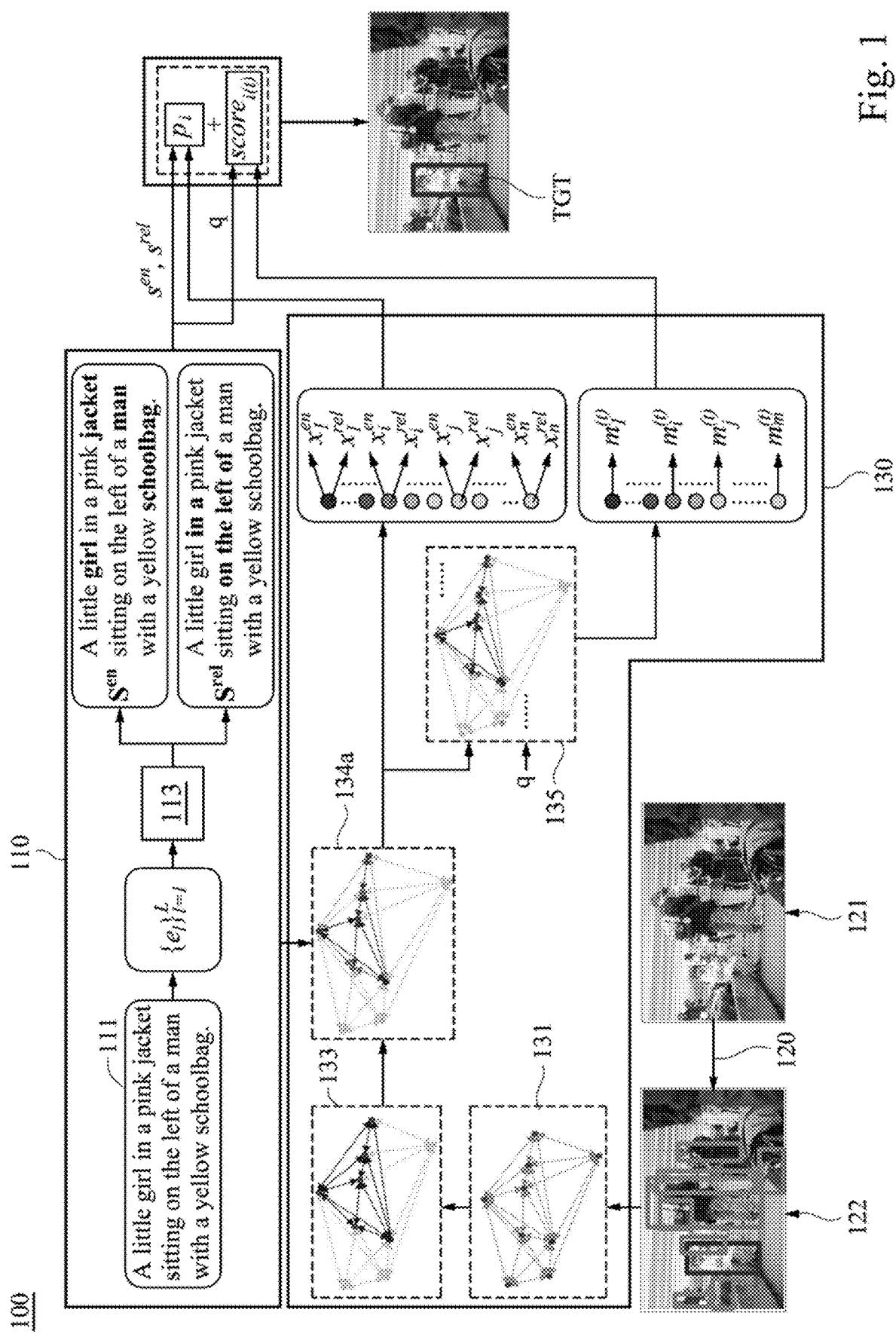
FIG. 1 is a schematic diagram illustrating a neural network architecture according to some embodiments of the present disclosure.

FIG. 1 is a schematic diagram illustrating a neural network architecture 100 according to some embodiments of the present disclosure. In structure, the neural network architecture 100 includes a text recognition network 110, an object detection network 120 and an enhanced cross-modal graph attention network 130. The neural network architecture 100 is configured to detect a target region which matches an expression of a text.

For example, if a user wants to find a girl wearing a pink jacket from an image displayed on the monitor, an input text 111 of "A little girl in a pink jacket sitting on the left of a man with a yellow schoolbag" can be input to the neural network architecture 100. The text recognition network 110 extracts vectors of entity objects of "girl", "jacket", "man", "schoolbag" as entity features $s^{en}$, and the text recognition network 110 extracts vectors of semantic relations of "in" and "on the left of" as relation features $s^{rel}$, and the text recognition network 110 extracts an overall feature from a whole content of the input text 111. Therefore, it can output the vector corresponding to an expression of the input text 111.

To detect a target object in an image, the object detection network 120 detects classification of all of the objects in the input image 121, and create the candidate regions 122 corresponding to all of the objects. That is, the output of the object detection network 120 includes the candidate regions 122 corresponding to all of the objects in the input image 121.

The enhanced cross-modal graph attention network 130 generates node features $x_1^{en} \sim x_n^{en}$, aggregated edge features $x_1^{rel} \sim x_n^{rel}$ and compound features $m_1^{(t)} \sim m_m^{(t)}$ according to the results output from the text recognition network 110 and the object detection network 120. How to generate the node features $x_1^{en} \sim x_n^{en}$, the aggregated edge features $x_1^{rel} \sim x_n^{rel}$ and the compound features $m_1^{(t)} \sim m_m^{(t)}$, by the enhanced cross-modal graph attention network 130, according to the results output from the text recognition network 110 and the object detection network 120 will be discussed in detail in the following embodiments.

The neural network architecture 100 generates a first score $p_i$ of the i-th node according to matching results between the node features $x_1^{en} \sim x_n^{en}$, the aggregated edge features $x_1^{rel} \sim x_n^{rel}$ output from the enhanced cross-modal graph attention network 130 and the entity features $s^{en}$ and relation features $s^{rel}$ output from the text recognition network 110.

The neural network architecture 100 generates the second score $\text{score}_{i(t)}$ of the i-th node according to matching results between compound features $m_1^{(t)} \sim m_m^{(t)}$ output from the enhanced cross-modal graph attention network 130 and the overall feature output from the text recognition network 110.

The neural network architecture 100 generates a final score of the i-th node according to the first score $p_i$ and the second score $\text{score}_{i(t)}$ of the i-th node, wherein the said i-th nod can be any one of the first node to the last node.

Therefore, the neural network architecture 100 can obtain the final scores of all of the nodes. In some embodiments, the nodes correspond to a portion of the candidate regions 122 in the input image 121, the said the portion of the candidate regions 122 can be considered as high attention regions. Therefore, the neural network architecture 100 determines a target region TGT corresponds to the expression of the input text 111 according to the final scores of the high attention regions.

Figure 2:
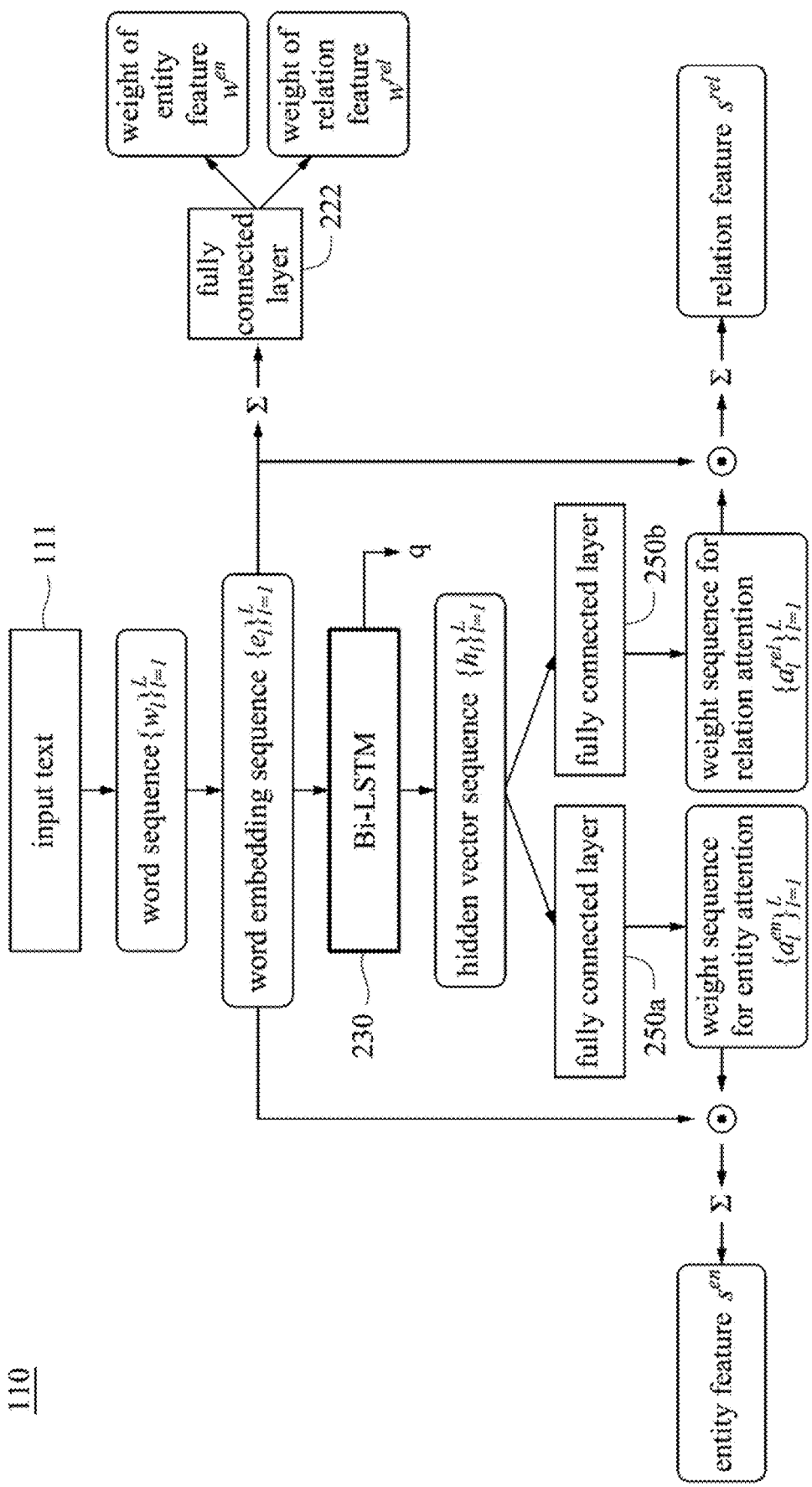
FIG. 2 is a schematic diagram illustrating a text recognition network according to some embodiments of the present disclosure.
Figure 3:
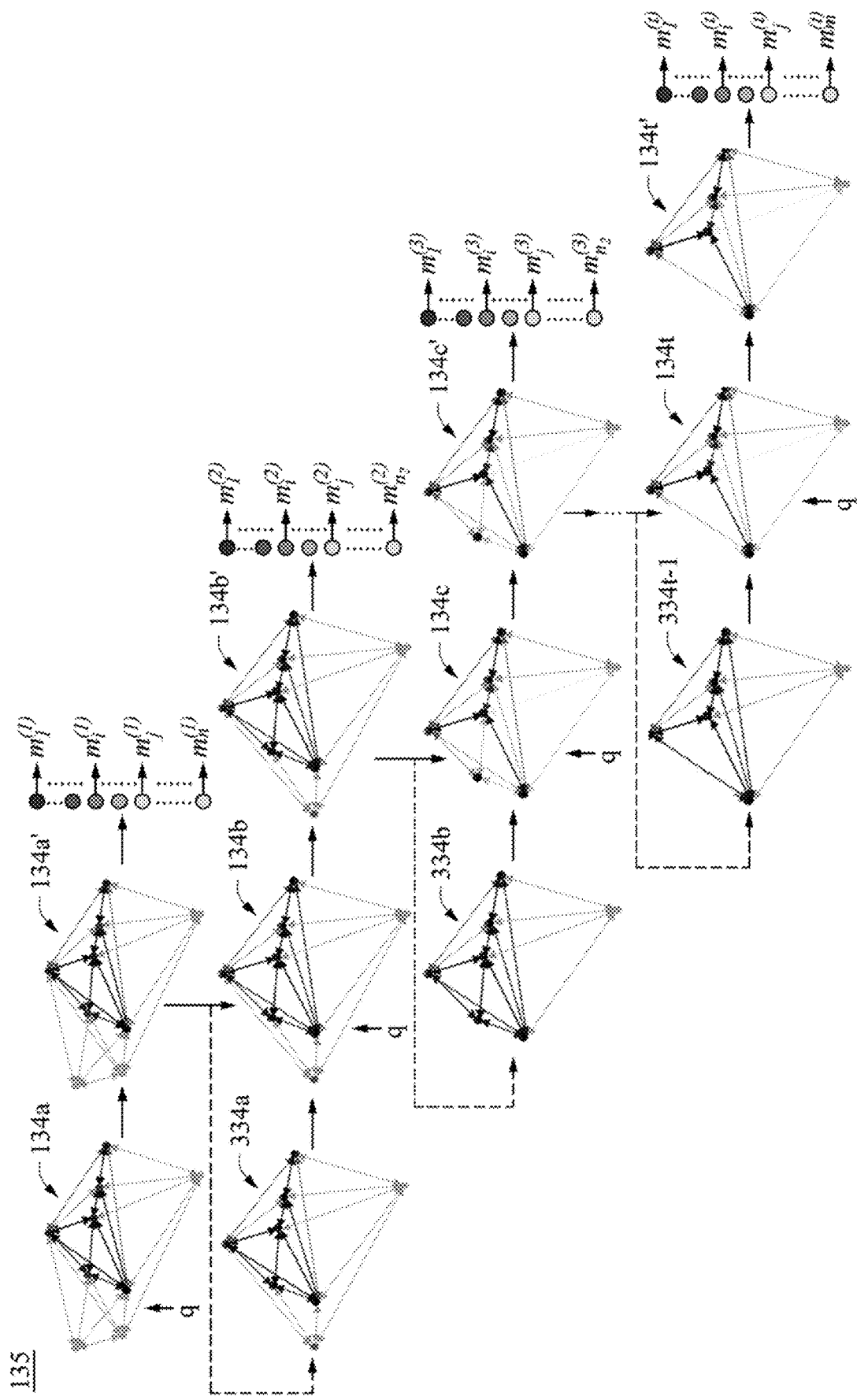
FIG. 3 is a schematic diagram illustrating multi-step seasoning graph attention networks according to some embodiments of the present disclosure.
Figure 4A:
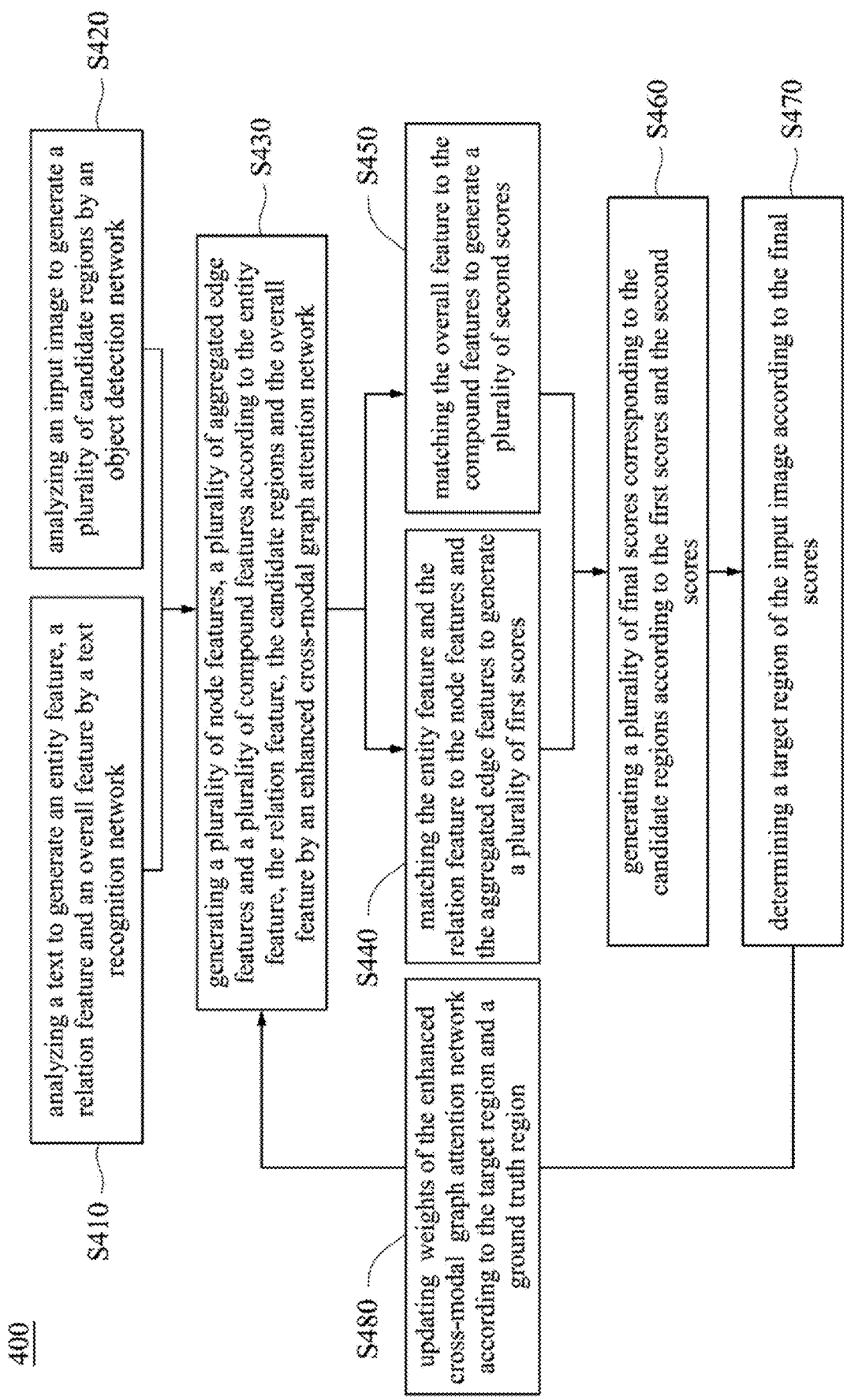
FIG. 4A is a flow chart illustrating a recognition method according to some embodiments of the present disclosure.
Figure 4B:
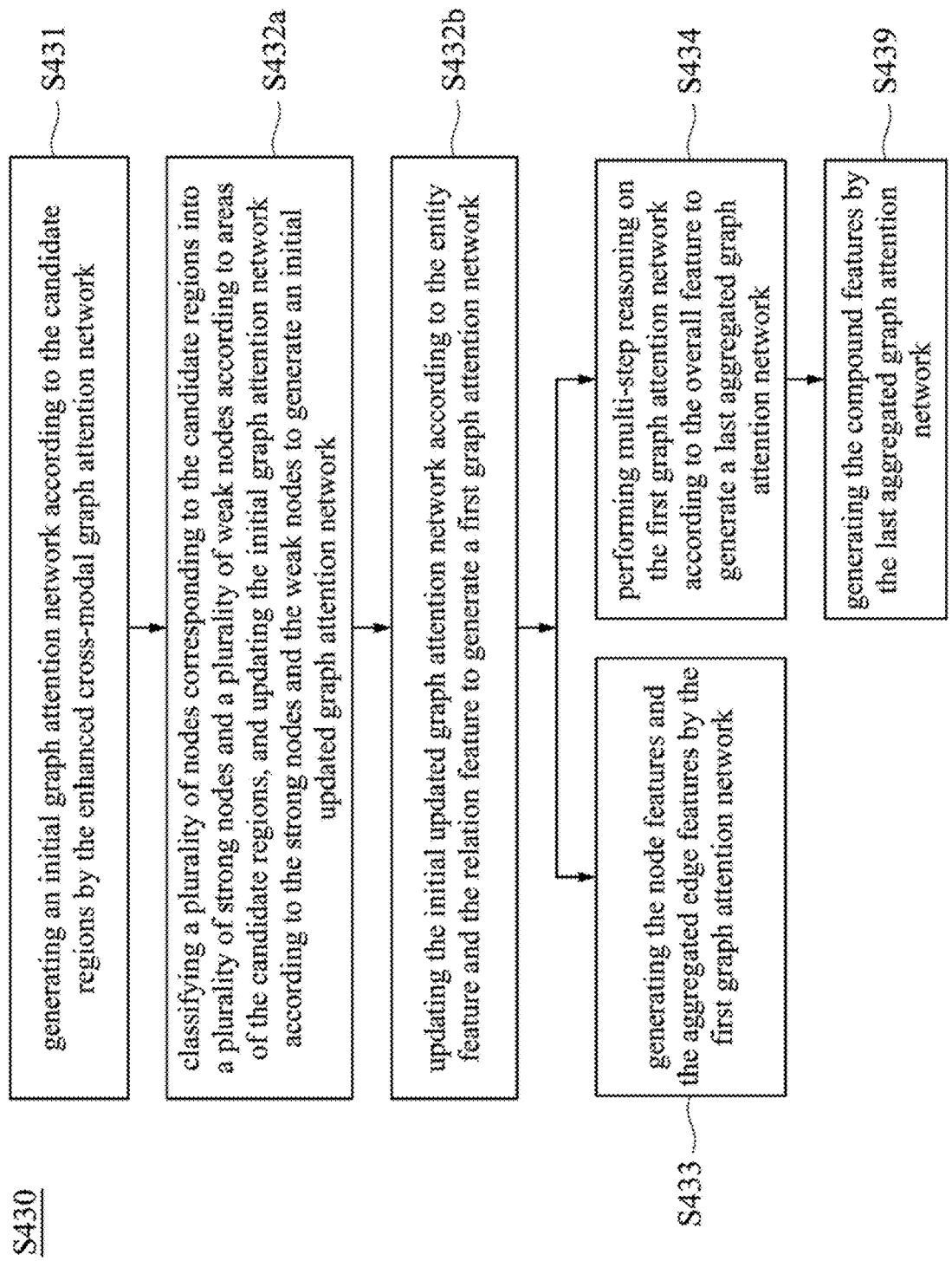
FIG. 4B is a schematic diagram illustrating a step S430 of the recognition method 400 in FIG. 4A according to some embodiments of the present disclosure.
Figure 4C:
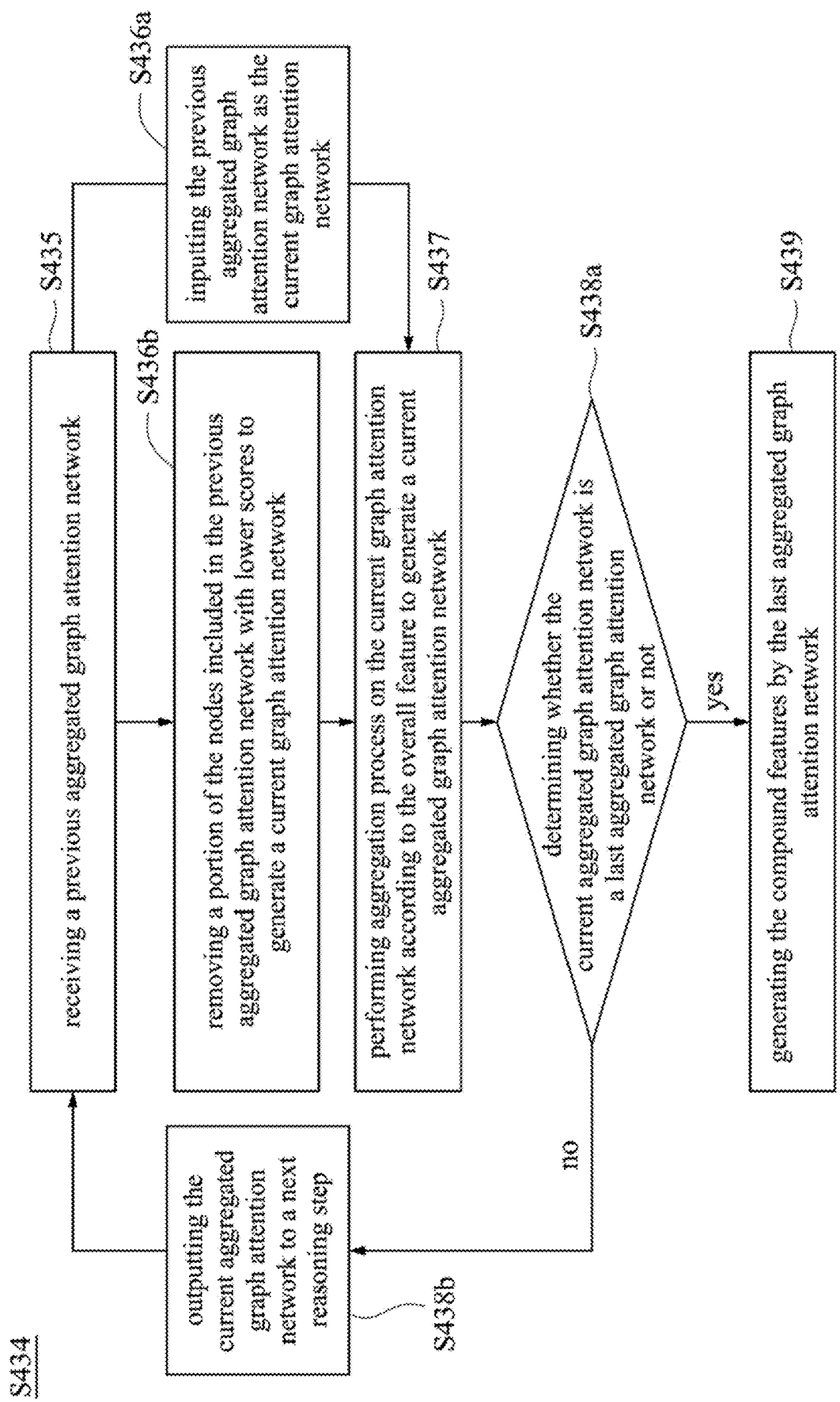
FIG. 4C is a schematic diagram illustrating a step S434 of the recognition method 400 in FIG. 4C according to some embodiments of the present disclosure.
Figure 5B:
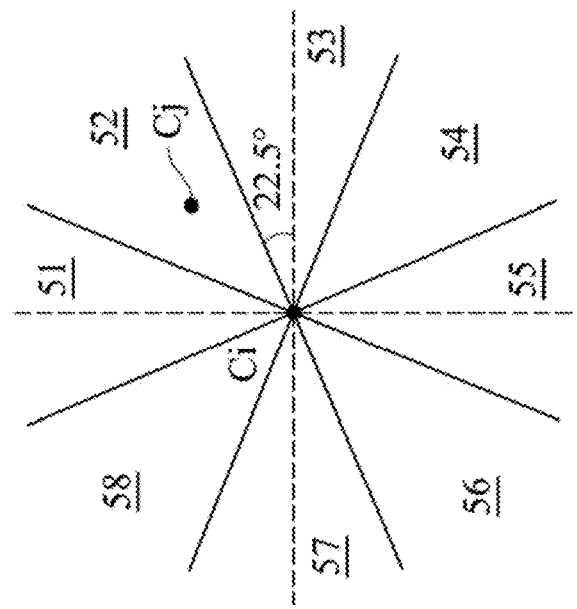
FIG. 5A to FIG. 5B are schematic diagrams illustrating a spatial relationship between a i-th candidate region and a j-th candidate region according to some embodiments of the present disclosure.

Reference is made to FIG. 1 to FIG. 5B. FIG. 2 is a schematic diagram illustrating a text recognition network 110 according to some embodiments of the present disclosure. FIG. 3 is a schematic diagram illustrating graph attention networks 135 in multiple reasoning steps according to some embodiments of the present disclosure. FIG. 4A is a flow chart illustrating a recognition method 400 according to some embodiments of the present disclosure. FIG. 4B is a schematic diagram illustrating a step S430 of the recognition method 400 in FIG. 4A according to some embodiments of the present disclosure. FIG. 4C is a schematic diagram illustrating a step S434 of the recognition method 400 in FIG. 4C according to some embodiments of the present disclosure. Wherein, the recognition method 400 includes steps S410~S470. FIG. 5A to FIG. 5B are schematic diagrams illustrating a spatial relationship between a i-th candidate region and a j-th candidate region according to some embodiments of the present disclosure.

In step S410, a text is analyzed, by a text recognition network 110, to generate an entity feature $s^{en}$, a relation feature $s^{rel}$ and an overall feature. In some embodiments, the text recognition network 110 includes a language self-attention module 113, and a feature extraction model included in the language self-attention module 113 can be implemented by bi-directional long short-term memory (Bi-LSTM).

Specifically, the text recognition network 110 generates word sequence $\{w_l\}_{l=1}^{L}$ for referring L words based on an expression of the input text 111. The text recognition network 110 uses a non-linear function to embed the one-hot representations of each word into a continuous space, so as to form a word embedding sequence $\{e_l\}_{l=1}^{L}$.

The word embedding sequence $\{e_l\}_{l=1}^{L}$ is input to a fully connected layer 222 to generate an entity weight $w^{en}$ and a relation weight $w^{rel}$, wherein the entity weight $w^{en}$ and the relation weight $w^{rel}$ can be represented by the following function.

$$w^{en} = \frac{\exp(w_{en_w}^T e)}{\exp(w_{en_w}^T e) + \exp(w_{rel_w}^T e)}$$

$$w^{rel} = \frac{\exp(w_{rel_w}^T e)}{\exp(w_{en_w}^T e) + \exp(w_{rel_w}^T e)}$$

In the above formulas, "e" is to express a sum of word sequence $\{e_l\}_{l=1}^{L}$. The "e" is input to the fully connected layer. The distribution parameters of fully connected layer 222 is expressed by $w_{en_w}^T$ and $w_{rel_w}^T$.

The word sequence $\{e_l\}_{l=1}^{L}$ is input to the bi-directional long short-term memory 230 to generate an overall feature q and a hidden vector sequence $\{h_l\}_{l=1}^{L}$.

In some embodiments, the hidden vector sequence $\{h_l\}_{l=1}^{L}$ is generated by combining outputs of a forward transmission and outputs of a backward transmission. In some embodiments, the overall feature q can be an output of a last layer of the bi-directional long short-term memory 230, and the overall feature q can be considered as a feature of whole input text 111.

The fully connected layers 250a and 250b respectively generate a weight sequence for entity attention $\{a_l^{en}\}_{l=1}^{L}$ and a weight sequence for relation attention $\{a_l^{rel}\}_{l=1}^{L}$ according to the hidden vector sequence $\{h_l\}_{l=1}^{L}$, the weight sequence for entity attention $\{a_l^{en}\}_{l=1}^{L}$ and the weight sequence for relation attention $\{a_l^{rel}\}_{l=1}^{L}$ can be expressed by the following formulas:

$$a_l^{en} = \frac{\exp(w_{en}^T h_l)}{\sum_{i=1}^{L}\exp(w_{en}^T h_i)} \quad a_l^{rel} = \frac{\exp(w_{rel}^T h_l)}{\sum_{i=1}^{L}\exp(w_{rel}^T h_i)}$$

In the above formulas, $h_l$ is to express a l-th hidden vector included in the hidden vector sequence $\{h_l\}_{l=1}^{L}$, and the distribution parameters of the fully connected layers 250a and 250b can be expressed by $w_{en}^T$ and $w_{rel}^T$.

The text recognition network 110 generates the entity feature $s^{en}$ according to a summation of the weight sequence for entity attention $\{a_l^{en}\}_{l=1}^{L}$ and the word embedding sequence $\{e_l\}_{l=1}^{L}$. The text recognition network 110 generates the relation feature rel according to the weight sequence for relation attention $\{a_l^{rel}\}_{l=1}^{L}$, wherein the entity feature $s^{en}$ and the relation feature $s^{rel}$ are expressed by the following formulas:

$$s^{en} = \sum_{l=1}^{L} a_l^{en} e_l$$

$$s^{rel} = \sum_{l=1}^{L} a_l^{rel} e_l$$

In the above mentioned formulas, $e_l$ is to express a l-th word embedding vector included in the word embedding sequence $\{e_l\}_{l=1}^{L}$, and the $a_l^{en}$ and $a_l^{rel}$ are to express a l-th weight for entity attention included in the weight sequence for entity attention $\{a_l^{en}\}_{l=1}^{L}$ and a l-th weight for relation attention included in the weight sequence for relation attention $\{a_l^{rel}\}_{l=1}^{L}$ respectively.

Therefore, if the expression of the input text 111 is "A little girl in a pink jacket siting on the left of a man with a yellow schoolbag," the entity feature $s^{en}$ output from the text recognition network 110 can highlight the entity words (such as, "girl", "jacket", "man" and "schoolbag"), and the relation feature rel output from the text recognition network 110 can highlight the relationships between the entity words (such as, "in" and "on the left of").

In step S420, the object detection network 120 is configured to analyze the input image 121 to generate the multiple candidate regions 122. In some embodiments, the object detection network 120 can be implemented by ResNet101, VGG16 or other neural network architecture capable for marking objects with bounding boxes (or candidate box/ regions) and detecting classifications of the objects in the bounding boxes, which is not intend to limit the present disclosure.

In some embodiments, a dimension of the outputs of the said ResNet101 is 4096, a dimension of the outputs of the said VGG16 is 2048. In other embodiments, a dimension of the outputs the object detection network 120 can be correspondingly designed based on the overall configuration, which is not intend to limit the present disclosure.

In function, the object detection network 120 detects the candidate regions 122 of all of objects in the input image 121 and classify the objects in the candidate regions 122, so as to generate the visual feature (such as, the classifications of the objects) of the said objects.

In step, S430, the enhanced cross-modal graph attention network 130 is configured to generate the node features $x_1^{en} \sim x_n^{en}$ and the aggregated edge features $x_1^{rel} \sim x_n^{rel}$ about the first to the n-th nodes according to the entity feature $s^{en}$, the relation feature s rei, the candidate regions 122 and the overall feature, and the enhanced cross-modal graph attention network 130 is configured to generate the compound features $m_1^{(t)} \sim m_m^{(t)}$ about the first to the m-th nodes. Wherein, the subscript symbols of the node features $x_1^{en} \sim x_n^{en}$, the aggregated edge features $x_1^{rel} \sim x_n^{rel}$ and the compound features $m_1^{(t)} \sim m_m^{(t)}$ are to express the corresponding node numbers, and the same number corresponds to the same nodes.

Step S430 includes S431~s439.

In step S431, an initial graph attention network 131 is generated, by the enhanced cross-modal graph attention network 130, according to the candidate regions 122. A i-th node of the initial graph attention network 131 is generated according to the i-th candidate region, wherein an initial feature of the i-th node can be expressed by $x_i$. The said i-th node can be any node included in the first to the n-th nodes of the initial graph attention network 131. The initial feature $x_i$ of the i-th node can be expressed by the following formula:

$$x_i = [v_i, l_i]$$

In the above formula, the visual feature (or object classification) which output from the object detection network 120 can be expressed by $v_i$. The spatial feature of the i-th candidate region which output from the object detection network 120 also can be expressed by $l_i$, and wherein $l_i$ can be expressed by the following formula:

$$l_i = \left[\frac{x_{cent_i}}{H_i}, \frac{y_{cent_i}}{W_i}, H_i, W_i, H_i \cdot W_i\right]$$

In above formula, the central point of the i-th candidate region are expressed by $(x_{cent_i}, y_{cent_i})$. The length, width and area of the i-th candidate region are respectively expressed by $H_i$, $W_i$ and $H_i \cdot W_i$.

In some embodiments, the initial edge feature between the i-th node (which corresponds to the i-th candidate region) and the j-th node (which corresponds to the j-th candidate region) can be express by the following formula.

$$\varepsilon_{ij} = f_{emb}(e_{ij}; r_{ij})$$

In the above formula, the initial edge feature is expressed by $\varepsilon_{ij}$. The multilayer perceptron is expressed by $f_{emb}$. The directional word of the j-th candidate region in respect to the i-th candidate region is expressed by $r_{ij}$. In some embodiments, the textual feature includes classifications for the upper side 51, the upper right side 52, the right side 53, the lower right side 54, the lower side 55, the lower left side 56, the left side 57, the upper left side 58. For example, the central point Cj of the j-th candidate region is located at the upper right side 52 of the central point Ci of the i-th candidate region, as shown in FIG. 5B. In this case, the vector of the textual feature $r_{ij}$ includes the information of "upper right".

Figure 5A:
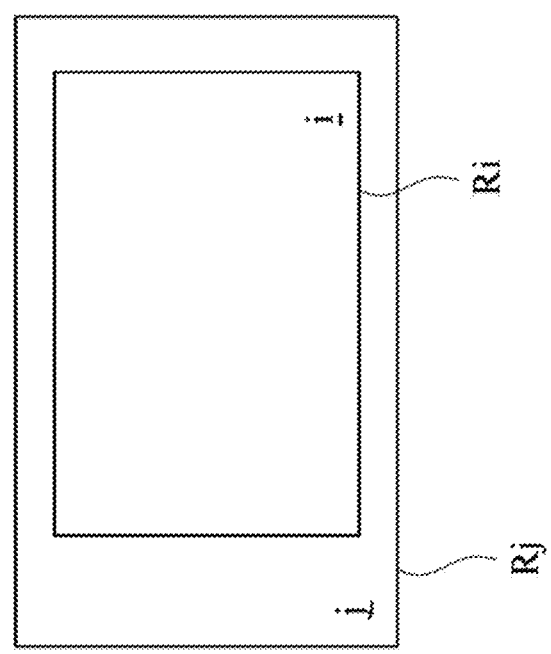

In some embodiments, the textual feature $r_{ij}$ can further include the classification that the i-th candidate region Ri is located at the inside of the j-th candidate region Rj or the i-th candidate region Ri is overlap with the j-th candidate region Rj. For example, the i-th candidate region Ri is located at the inside of the j-th candidate region Rj, as shown in FIG. 5A. In this case, the vector of the textual feature $r_{ij}$ includes the information of "inside".

A spatial location of the j-th node corresponding to the j-th candidate region in respect to the i-th node corresponding to the i-th candidate region is expressed by a spatial relationship $e_{ij}$, wherein the spatial relationship $e_{ij}$ can be expressed by the following formula.

$$e_{ij} = \left[ \frac{x_{cent_i} - x_{cent_j}}{H}, \frac{y_{cent_i} - y_{cent_j}}{W}, \frac{H_i - H_j}{H}, \frac{W_i - W_j}{W}, \frac{W_i H_i - W_j H_j}{HW} \right]$$

In the above formula, the central point of the j-th candidate region is expressed by $(x_{cent_j}, y_{cent_j})$. The length, width and area of the j-th candidate region can be expressed by $H_j$, $W_j$ and $H_j \cdot W_j$. The length, width and area of entire input image 121 can be expressed by H, W and H·W.

In step S432a, a plurality of nodes corresponding to the candidate regions 122 are classified into a plurality of strong nodes and a plurality of weak nodes according to areas of the candidate regions 122, and the initial graph attention network 131 is updated according to the strong nodes and the weak nodes to generate an initial updated graph attention network 133. For example, the candidate regions 122 are arranged into a descending order according to the sizes of the candidate regions 122, and wherein P nodes corresponding to P candidate regions ranking in the front are designated as strong nodes, the other nodes are designated as weak nodes. In some embodiments, each edge connected between a strong node and a strong node is designated as a strong edge. Each edge connected between a strong node and a weak node is designated as a weak edge, and each edge connected between a weak node and a weak node is designated as a weak edge.

If the edge between the i-th node and the j-th node is a strong node, the aforesaid initial edge feature $\varepsilon_{ij}$ is generated according to a strong relationship. In this case, the said initial edge feature can be implemented by a strong edge feature $\varepsilon_{ij}^s$.

If the edge between the i-th node and the j-th node is a weak node, the aforesaid initial edge feature $\varepsilon_{ij}$ is generated according to a weak relationship. In this case, the said initial edge feature $\varepsilon_{ij}$ can be implemented by a weak edge feature $\varepsilon_{ij}^w$.

In step S432b, the initial updated graph attention network 133 is updated according to the entity feature $s^{en}$ and the relation feature rel to generate a first graph attention network 134a.

In step S433, the node features $x_1^{en} \sim x_n^{en}$ and the aggregated edge features $x_1^{rel} \sim x_n^{en}$ are generated by the first graph attention network 134a. The node feature $x_i^{en}$ of the i-th candidate region can be expressed by the following formula.

$$x_i^{en} = C_i x_i$$

$$C_i = \frac{e^{(C_i')}}{\sum_{j=1}^N e^{(C_j')}}$$

$$C_i' = \alpha_i \cdot W_e^T \tanh(W_{en}^s s^{en} + W_{en}^l x_i)$$

$$\alpha_i = \frac{s_i}{S}$$

In above formula, parameters $w_e^T$, $W_{en}^s$ and $w_{en}^l$ are trainable parameters. a ratio of an area of the i-th candidate region to an area S of the entire input image 121 is expressed by $\alpha_i$. Therefore, the entity feature $s^{en}$ of the input text 111 and the initial feature $x_i$ of the i-th candidate region are input to the activation function to obtain the weight $C_i'$ of the i-th node (which corresponding to the i-th candidate region). And, the weight $C_i'$ of the i-th node is positively correlated with the area ratio $\alpha_i$. Therefore, the node feature $x_i^{en}$ of the i-th candidate region can be obtained. The entity feature $s^{en}$ of the input text 111 and the visual feature $v_i$ and the spatial feature $l_i$ included in the the i-th candidate region can be embedded in to the node feature $x_i^{en}$.

The aggregated edge feature $x_i^{rel}$ of the i-th candidate region can be expressed by the following formula.

$$x^{rel} = \sum_{j=1}^N A_{ij} \varepsilon_{ij}$$

$$A = [A_{ij}] = softmax\left( \begin{bmatrix} A_{kk}^s & A_{k*(k+1,N)}^w \\ A_{(k+1,N)*k}^w & A_{(k+1,N)*(k+1,N)}^w \end{bmatrix} \right)$$

$$A_{ij}^s = \{\alpha_i, \alpha_j\}_{max} W_s^T \tanh(W_{s,s} s^{rel} + W_{s,e} \varepsilon_{ij}^s), 0 \le i, j \le k$$

$$A_{ij}^w = \{\alpha_i, \alpha_j\}_{min} W_w^T \tanh(W_{w,s} s^{rel} + W_{w,e} \varepsilon_{ij}^w), i \text{ or } j \ge 1 + k$$

In above formula, the initial edge feature $\varepsilon_{ij}$ is determined as the strong edge feature $\varepsilon_{ij}^s$ or the weak edge feature E according to the i-th candidate region and the j-th candidate region by operations in step S432a. And, the relation feature s rei of the input text 111 and the strong feature $\varepsilon_{ij}^s$ or the weak edge feature $\varepsilon_{ij}^w$ are input to the activation function to generate strong attention $A_{ij}^s$ or weak attention $A_{ij}^w$. Therefore, the strong relationship/weak relationship between the i-th node (corresponding to the i-th candidate region) and the j-th node (corresponding to the j-th candidate region) and the relation feature $s^{rel}$ of the input text 111 are embedded into the aggregated edge feature $x_i^{rel}$ of the i-th node. Wherein, the configurations of the strong edge feature $\varepsilon_{ij}^s$ and the weak edge feature $\varepsilon_{ij}^w$ are to lower focus on the weak nodes, so as to decrease the entire amount of computation. The strong edge feature $\varepsilon_{ij}^s$ or the weak edge feature $\varepsilon_{ij}^w$ includes the textual feature $r_{ij}$ between i-th node (corresponding to the i-th candidate region) and the j-th node (corresponding to the j-th candidate region). Therefore, if there is a directional word in the input text 111, it can greatly shorten the computation time and increase the accuracy of the enhanced cross-modal graph attention network 130.

In some embodiments, step S440 is executed after step S434.

In step S440, the entity feature $s^{en}$ and the relation feature $s^{rel}$ are matched to the node features $x_1^{en} \sim x_n^{en}$ and the aggregated edge features $x_1^{rel} \sim x_n^{en}$ to generate a plurality of first scores. Specifically, the first score of the i-th node can be expressed by the following formula.

$$p_i = w^{en} p_i^{en} + w^{rel} p_i^{rel}$$

$$p_i^{en} = \tanh(W_{en} s^{en})^T \tanh(W_{en}' x_i^{en})$$

$$p_i^{rel} = \tanh(W_{rel} s^{rel})^T \tanh(W_{rel}' x_i^{rel})$$

In above formula, $W_{en}$, $W_{en}'$, $W_{rel}$, and $W_{rel}'$ are trainable parameters. The first score of the i-th node is expressed by $p_i$. The entity score of the i-th node is expressed by the $p_i^{en}$, and the relation score of the i-th node is expressed by $p_i^{rel}$.

The entity score $p_i^{en}$ of the i-th node is generated according to a matching result of the node feature $x_i^{en}$ of the ith node and the entity feature $s^{en}$. The relation score $p_i^{rel}$ of the i-th node is generated according to a matching result of the aggregated edge feature $x_i^{rel}$ of the i-th node and relation feature $s^{rel}$.

As a result, the first score can be obtained according to the entity $score_{p_i^{en}}$ and the relation $score_{p_i^{rel}}$ of the i-th node. Similarity, first scores of the first to the n-th nodes can be obtained by the aforesaid operations, the first scores of the first to the n-th nodes can be expressed by $\{p_i\}_1^n$.

In step S434, multi-step reasoning is performed on the first graph attention network 134a according to the overall feature to generate a last aggregated graph attention network 134t'.

Specifically, the first graph attention network 134a is aggregated under the effect of the overall feature to generate the first aggregated graph attention network 134a'. The first aggregated graph attention network 134a' outputs the compound features $m_1^{(1)} \sim m_m^{(1)}$, and the compound feature $m_i^{(1)}$ of the i-th node included in the first aggregated graph attention network 134a' can be expressed by the following formula, wherein the compound feature $m_i^{(1)}$ of the i-th node is any compound feature of the corresponding node included in the compound features $m_1^{(1)} \sim m_m^{(1)}$.

$$m_i^{(1)} = \delta\left(\tilde{m}_i^{(0)} + \overleftarrow{m}_i^{(0)}\right)$$

$$\overleftarrow{m}_i^{(1)} = \sum_{\varepsilon_{ij}>0} A_{ij}\left(C_j \overleftarrow{W} m_j^{(0)} + \overleftarrow{b}_{\varepsilon_{ij}}\right)$$

$$\tilde{m}_i^{(1)} = C_i \tilde{W} m_i^{(0)} + \tilde{b}_i^{(0)}$$

In above formula, $\tilde{W}$, $\tilde{b}_i^{(0)}$, $\overleftarrow{W}$ and $$\overleftarrow{b}_{\varepsilon_{ij}}$$

are trainable parameters, and sigmoid of the activation function is expressed by $\delta$. The node feature $x_i^{en}$ of the i-th node (which corresponds to i-th candidate region) is equal to the $m_i^{(0)}$. That is, $m_i^{(0)}$ is substituted by the node feature $x_i^{en}$ of the i-th node. Therefore, the compound feature $m_i^{(1)}$ of the first aggregated graph attention network 134a' is an aggregation of the node features of nodes which adjacent to the i-th node.

As a result, the compound features $m_1^{(1)} \sim m_n^{(1)}$ generated by the first aggregated graph attention network 134a' are matched to the overall feature of the input text 111 to generate the second scores. The second score of the i-th node can be expressed by the following formula.

$$score_{i(1)} = L2\text{Norm}(W_m m_i^{(1)}) \odot L2\text{Norm}(W_q q)$$

In above formula, after the first reasoning step, the second score of the i-th node is expressed by $score_{i(1)}$, wherein $W_m$ and $W_q$ are trainable parameters. The L2Norm means $l^2$-normalization. Therefore, the second score $score_{i(1)}$ of the i-th node can be obtained according to a matching result of the compound feature $m_1^{(1)}$ of the i-th node and the overall feature. In other word, the second score $score_{i(1)}$ of the i-th node is related to the matching result of the compound feature $m_i^{(1)}$ of the i-th node and the overall feature.

Similarity, after the first reasoning step, the second scores of the first to the m-th nodes can be obtained by the aforesaid operations, the second scores of the first to the n-th nodes can be expressed by $\{score_{i(1)}\}_{i=1}^n$.

At a training stage, the number of nodes (e.g. M nodes) in the last reasoning step is the same as the number of nodes (e.g. N nodes) of the aforementioned initial graph attention network 131. At an inference stage, graph node erase techniques is adopted in the reasoning graph attention networks 135 in multiple reasoning steps of the neural network architecture 100 in the present disclosure. Therefore, the number of nodes (e.g. M nodes) in the last reasoning step is less than the number of nodes (e.g. N nodes) of the aforementioned initial graph attention network 131. How to execute the graph node erasing on at the inference stage will be described in detailed in the following embodiments.

Therefore, the scores of the first to the n-th nodes in the first reasoning step can be obtained according to the aforesaid first scores $\{p_i\}_1^n$ and the second scores $\{score_{i(1)}\}_{i=1}^n$. A score of i-th node after the first reasoning step can be expressed by the following formula.

$$score_{i(1)}^P = \lambda_1 score_{i(1)} + \lambda_2 p_i$$

In above formula, the two hyper-parameters are expressed by $\lambda_1$ which are used for balance the first score $p_i$ and the second score $score_{i(1)}$. Therefore, the score of i-th node after the first reasoning step can be obtained according to the first score $p_i$ and the second score $score_{i(1)}$ of the i-th node after the first reasoning step, which can be expressed by $score_{i(1)}^P$. Similarity, scores of the first to the n-th nodes after the first reasoning step can be calculated by the aforesaid operations, and the scores of the first to the n-th nodes after the first reasoning step are expressed by $\{score_{i(1)}^P\}_{i=1}^n$.

Step S434 includes S435~S439. To be noted that, in the training stage, step S436a is executed after step S435. In the inference stage, step S436b is executed after step S435, in order to execute graph node erasing operation in step S436b.

In step S435, a previous aggregated graph attention network is received. For example, the first aggregated graph attention network 134a' is received from the first reasoning step.

At training stage, step S436a is executed. In step S436a, the previous aggregated graph attention network is input to a current reasoning step as the current graph attention network. For example, in a second reasoning step, the first aggregated graph attention network 134a' is directly used as the second graph attention network 134b at the training stage, and step S437 is executed.

At inference stage, step S436b is executed. In step S436b, a portion of the nodes included in the previous aggregated graph attention network with lower scores are removed to generate a current graph attention network. For example, at the inference stage, in a second reasoning step, a portion of the nodes of the first aggregated graph attention network 134a' with the lower scores are removed to generate a first sub-graph attention network 334a which is used as the second graph attention network 134b at the inference stage. In some embodiments, the said scores (such as, the scores $\{score_{i(1)}^P\}_{i=1}^n$) are all the nodes of the previous aggregated graph attention network (such as, the first aggregated graph attention network 134a') after the previous reasoning step (such as, the first reasoning step). For example, the said scores of all of the nodes of the first aggregated graph attention network 134a' are arranged in a descending order, and wherein 30% nodes ranking in the behind are removed. The first sub-graph attention network 334a is input to the second reasoning step as the second graph attention network 134b, and step S437 is executed.

In some embodiments, after the first reasoning step, K % nodes are removed in each reasoning step of the second to the last reasoning step. Therefore, the number of all the nodes of the first aggregated graph attention network 134a' is supposed to be N, the nodes of the first sub-graph attention network 334a is expressed by (N–N*K %).

In step S437, aggregation process is performed on the current graph attention network according to the overall feature to generate a current aggregated graph attention network. For example, the second graph attention network 134b is aggregated according to the overall feature to generate the second aggregated graph attention network 134b'. In some embodiments, the aggregation process performed on the second graph attention network 134b (or any one of the second graph attention network 134b to the last graph attention network 134t) is similar with the aggregation process performed on the first graph attention network 134a, and the descript is omitted here.

In step S438a, the current aggregated graph attention network is determined as a last aggregated graph attention network or not. If not, the step S438b is executed. If yes, step S439 is executed.

In step S438b, the current aggregated graph attention network is output to a next reasoning step. For example, the compound features $m_1^{(2)} \sim m_{n_2}^{(2)}$ of the second aggregated graph attention network 134b' is input to the third reasoning step, and step S435-S437 are executed to directly use the second aggregated graph attention network 134b' as the third graph attention network 134c or to generate the second sub-graph attention network 334b and use the second sub-graph attention network as the third graph attention network 134c. And, the reasoning step is then perform on third graph attention network 134c to generate compound features $m_1^{(3)} \sim m_{n_3}^{(3)}$ of the third aggregated graph attention network 134c'.

In some embodiments, after the first reasoning step, K % nodes are removed in each reasoning step of the second to the last reasoning steps. For example, the number of all the nodes of the first aggregated graph attention network 134a' is supposed to be N, and the number of all the nodes of the first sub-graph attention network 334a (or the second aggregated graph attention network 134b') is (N–N*K %). There are (N–N*K %)*K % nodes removed from the second aggregated graph attention network 134b' to generate second sub-graph attention network 334b.

In other word, the number of nodes of graph attention network in each reasoning steps is $N(1-K\%)^{(T-1)}$, the said "T" is the number of the reasoning step. If the number of the nodes of graph attention network in the current reasoning step is lower than a threshold (such as, 0.5), there will not remove any node in the following reasoning steps.

At inference stage, the (T–1)-th sub-graph attention network 334t-1 is used as the last graph attention network 134t to generate a last aggregated graph attention network 134t'.

In step S439, the compound features $m_1^{(t)} \sim m_m^{(t)}$ are generated by the last aggregated graph attention network 134t'. The compound feature $m_i^{(t)}$ of the i-th node in the last reasoning step can be expressed by the following formula, wherein the compound feature $m_i^{(t)}$ of the i-th node is designated as any one of the compound features $m_1^{(t)} \sim m_m^{(t)}$ of the corresponding node included in the last aggregated graph attention network 134t'.

$$m_i^{(t)} = \delta(\overrightarrow{m}_i^{(t)} + \overleftarrow{m}_i^{(t)})$$

$$\overleftarrow{m_i^{(t)}} = \sum_{\varepsilon_{ij}>0} A_{ij}^{(t-1)} \left( C_{jq}^{(t-1)} \overleftarrow{W} m_j^{(t-1)} + \overleftarrow{b}_{\varepsilon_{ij}} \right)$$

-continued $$\overrightarrow{m}_i^{(t)} = C_{iq}^{(t-1)} \widetilde{W} m_i^{(t-1)} + \widetilde{b}_i^{(t-1)}$$

$$C_{iq}^{(t-1)} = \frac{\exp(C_{iq}^{(t-1)'})}{\sum_{j=1}^{N} \exp(C_{jq}^{(t-1)'})}$$

$$C_{iq}^{(t-1)'} = W_m \tanh[W_{trans} m_i^{(t-1)} + q]$$

In above formula, $\widetilde{W}$, $\widetilde{b}_i^{(t-1)}$, $\overleftarrow{W}$ and $$\overleftarrow{b}_{\varepsilon_{ij}}$$

are trainable parameters, and the sigmoid of the activation function is expressed by the δ. In the (T–1)-th reasoning step, the node feature of the i-th node is expressed by $m_i^{(t-1)}$. That is, $m_i^{(t-1)}$ is substituted by the node feature of the i-th node in the (T–1)-th reasoning step. To be noted that, in the (T–1)-th reasoning step, the edge weight of the i-th node is expressed as $A_{ij}^{(t-1)}$, which can be expressed by the following formula.

$$A_{ij}^{(t-1)} = \frac{\exp(A_{ij}^{(t-1)'})}{\sum_{j=1}^{N} \exp(A_{ij}^{(t-1)'})}$$

$$A_{ij}^{(t-1)'} = m_i^{(t-1)T} m_j^{(t-1)}$$

In above formula, the compound feature of the j-th node in the (T–1) reasoning step is expressed by $m_j^{(t-1)}$. To be noted that, if the i-th node and the j-th node included more similar information, the value of the edge weight $A_{ij}^{(t-1)'}$ is greater.

Therefore, the compound feature $m_i^{(t)}$ of the last aggregated graph attention network 134' can aggregate the features of the adjacent nodes. Similarity, the compound features $m_1^{(t)} \sim m_m^{(t)}$ of the all the nodes in the last reasoning step can be obtained by the aforesaid operations.

In step S450, the overall feature is matched to the compound features $m_1^{(t)} \sim m_m^{(t)}$ to generate a plurality of second scores. The compound features $m_1^{(t)} \sim m_m^{(t)}$ generated by the last aggregated graph attention network 134' are matched to the overall feature to generate the second scores, wherein a second score of the i-th node in the last reasoning step is expressed by the following formula.

$$score_{i(t)} = L2Norm(W_m m_i^{(t)}) \odot L2Norm(W_q q)$$

In above formula, $W_m$ and $W_q$ are trainable parameters. The L2Norm means $l^2$-normalization. Therefore, the second score $score_{i(T)}$ of the i-th node can be obtained according to a matching result of the compound feature $m_1^{(t)}$ of the i-th node and the overall feature. In other word, the second score $score_{i(t)}$ of the i-th node is related to the matching result of the compound feature $m_i^{(t)}$ of the i-th node and the overall feature. In other, the second score $score_{i(t)}$ of the i-th node is related to the matching result of the compound feature $m_1^{(t)}$ and the overall feature. Similarity, the second scores $\{score_{i(t)}\}_{i=1}^{m}$ of the first to the m-th node of the last aggregated graph attention network 134t' by the aforesaid operations.

In step S460, a plurality of final scores $\{Pscore_i\}_{i=1}^{m}$ corresponding to the candidate regions are generated according to the first scores $\{p_i\}_1^n$ and the second scores {score$_{i(t)}$}$_{i=1}^{m}$. Therefore, the final scores {Pscore$_i$}$_{i=1}^{m}$ of the first to the m-th nodes after the last reasoning step can be obtained according to the first scores {p$_i$}$_1^n$ and the second scores {score$_{i(t)}$}$_{i=1}^{m}$. The final score of the i-th score node after the last reasoning step can be expressed by the following formula.

$$\text{score}_{i(t)}^p = \lambda_1 \text{score}_{i(t)} + \lambda_2 p_i$$

$$Pscore_i = \frac{\exp(\text{score}_{i(t)}^p)}{\sum_{j=1}^{N} \exp(\text{score}_{j(t)}^p)}$$

In above formula, the final score {Pscore$_i$}$_{i=1}^{m}$ of the i-th node of the the last aggregated graph attention network 134t' can be calculated according to the second score score$_{i(t)}$ of the i-th node in the last reasoning step and the first score$_{p_i}$ of the i-th node. Similarity, the final scores {Pscore$_i$}$_{i=1}^{m}$ of the first to the m-th nodes of the last aggregated graph attention network 134t' can be calculated by the aforesaid operations.

In step S470, a target region TGT of the input image 121 is determined according to the final scores {Pscore$_i$}$_{i=1}^{m}$.

In some embodiments, step S470 includes operations at the training stage and operations at the inference stage.

At the training stage, the candidate region which corresponds to a highest final score included in the final scores {Pscore$_i$}$_{i=1}^{m}$ is determined/selected as the target region TGT.

At the inference stage, one or more candidate region which corresponds to final score included in the final scores {Pscore$_i$}$_{i=1}^{m}$ exceeding a threshold is determined/selected as the target region TGT.

Therefore, steps S410~S470 are executed at the inference stage to detect the target region TGT.

Step S480 is executed at the training stage to train the enhanced cross-modal graph attention network 130. In step S480, weights of the enhanced cross-modal graph attention network 130 are updated according to the target region TGT and a ground truth region corresponding to the input text 111 and the input image 121. For example, the weights of the enhanced cross-modal graph attention network 130 is updated according to the matching result of the final score of the target region TGT and the ground truth region. In some embodiments, a loss function of the enhanced cross-modal graph attention network 130 can be expressed by the following formula.

$$\mathcal{L} = -\log(P_{gt})$$

In above formula, the loss function is expressed by $\mathcal{L}$. The probability of the ground truth region is expressed by $P_{gt}$. Therefore, the loss function can be calculated to update the weights of the enhanced cross-modal graph attention network 130, in order to train the enhanced cross-modal graph attention network 130.

Figure 6A:
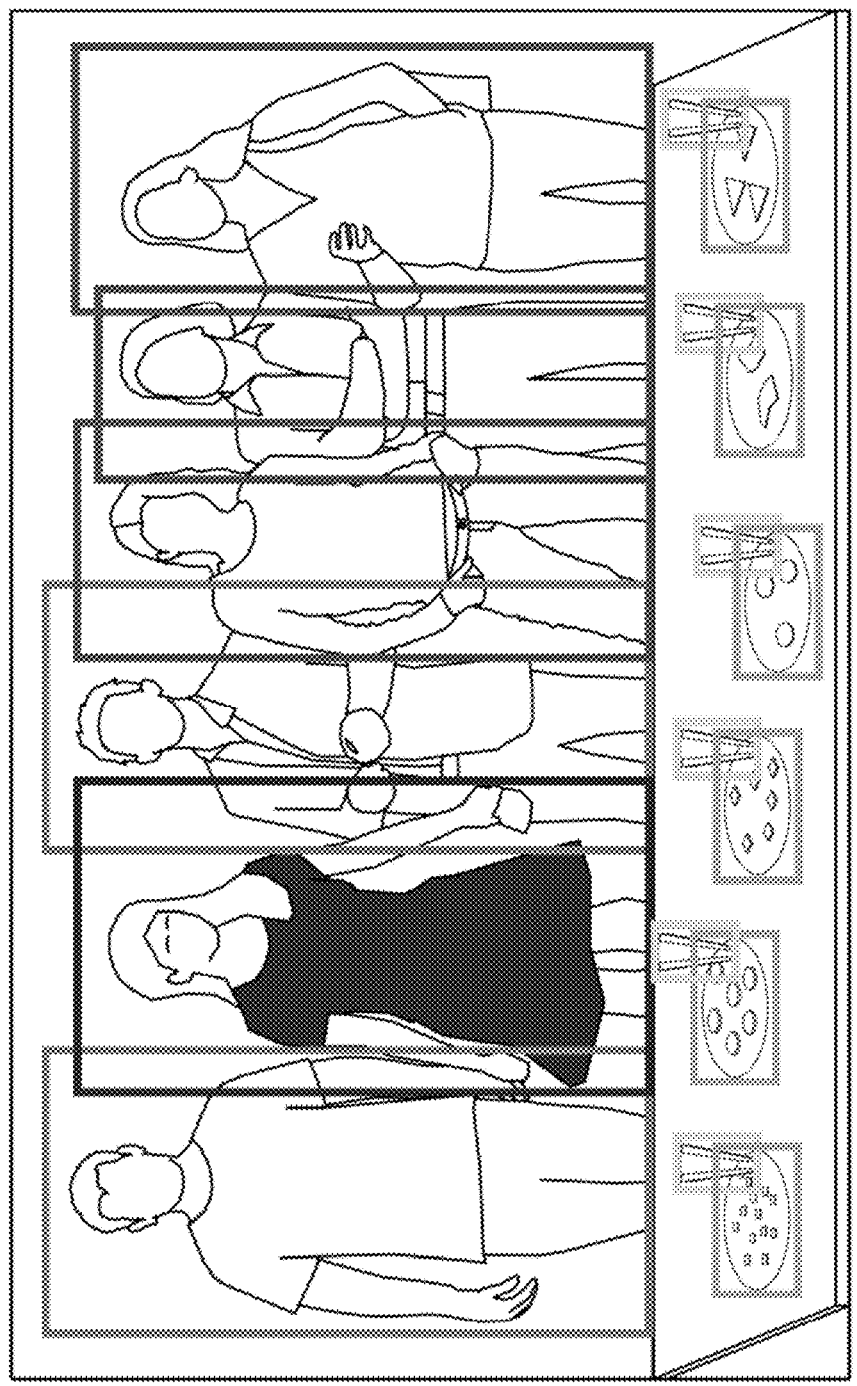
FIG. 6A to FIG. 6C are schematic diagrams illustrating outcomes of graph attention networks in multiple reasoning steps according to some embodiments of the present disclosure.
Figure 6B:
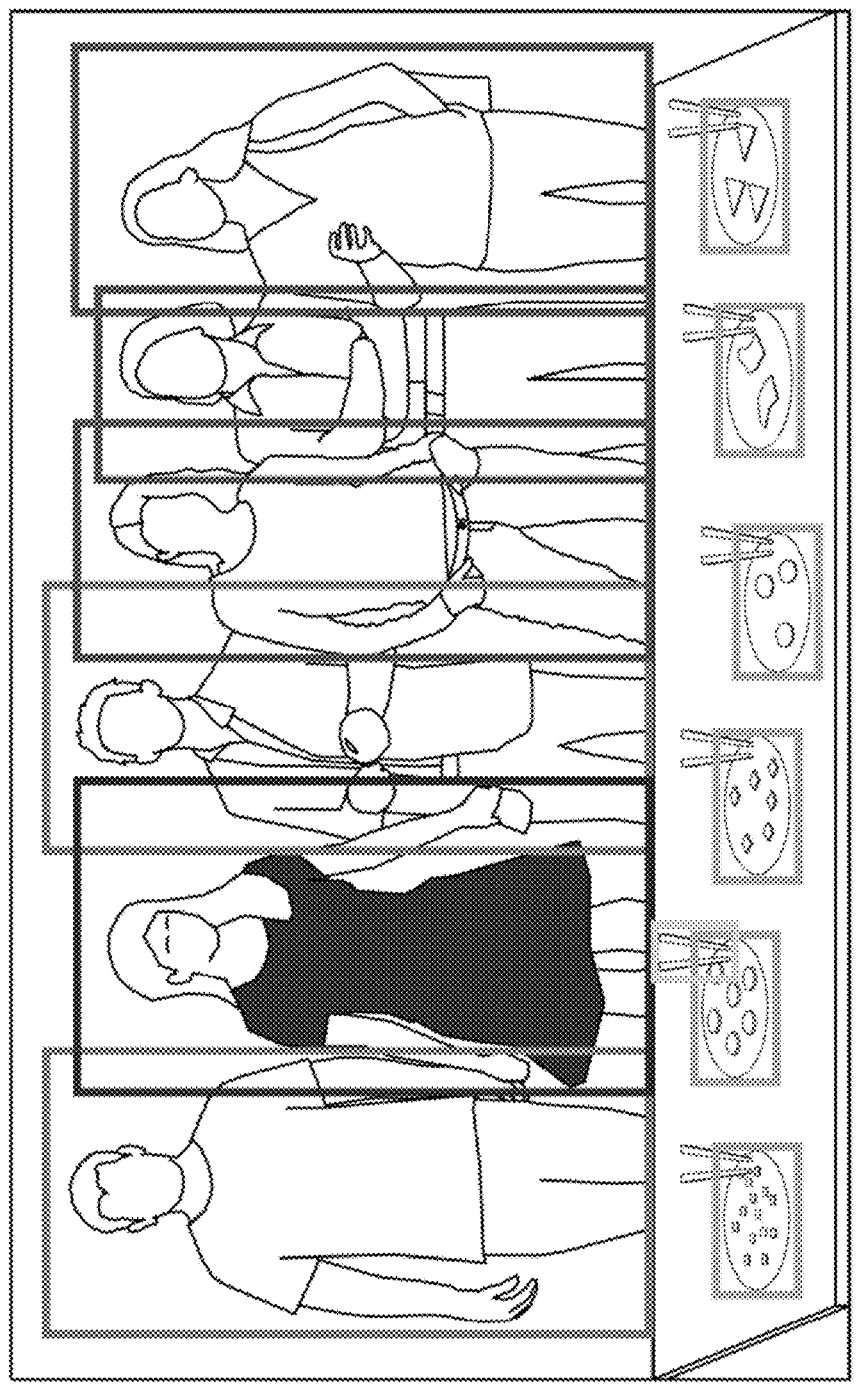
Figure 6C:
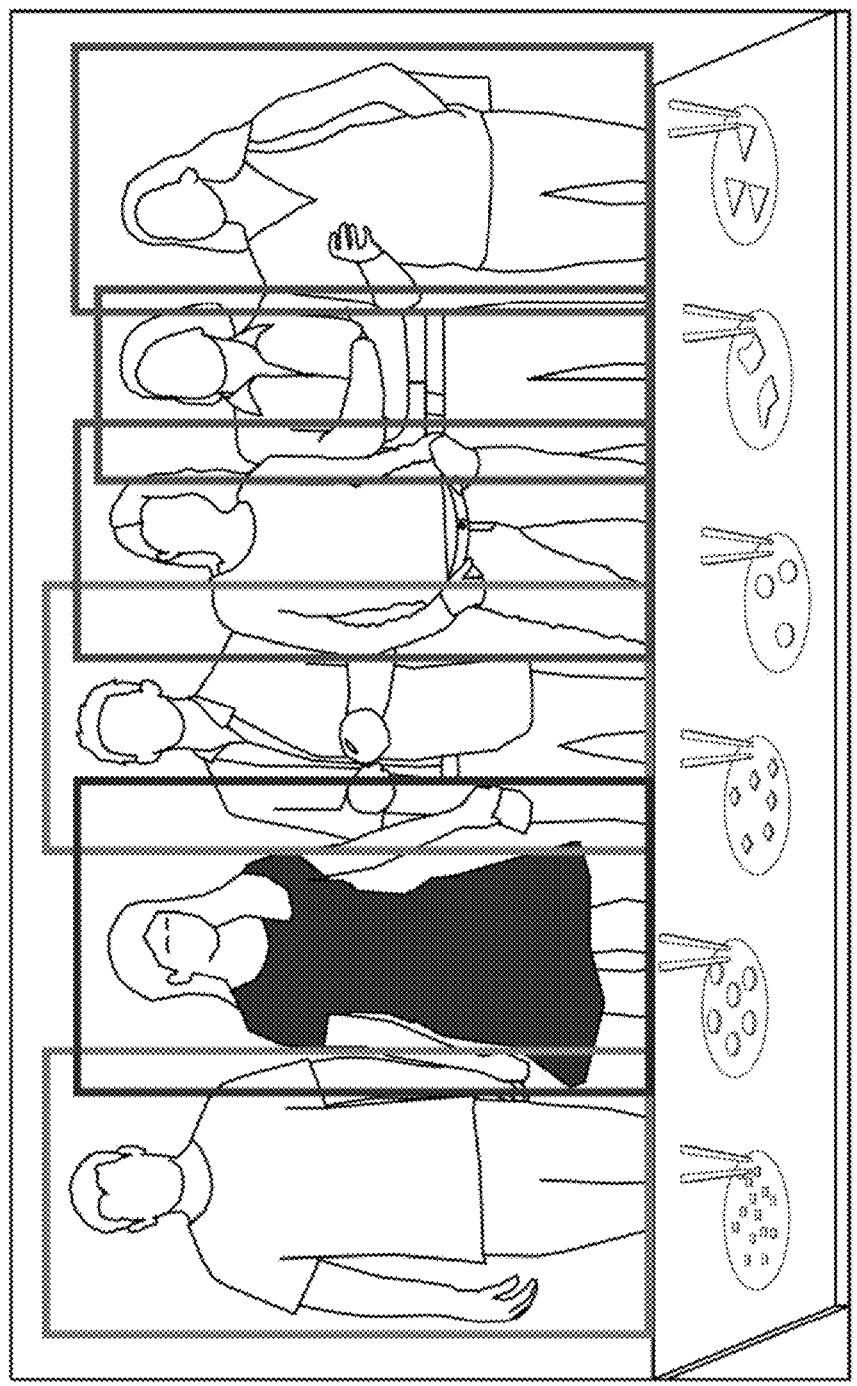

FIG. 6A to FIG. 6C are schematic diagrams illustrating outcomes of graph attention networks 135 in multiple reasoning steps according to some embodiments of the present disclosure. At the inference stage, a portion of nodes ranking in the behind are removed in each reasoning step of the multiple reasoning steps. Therefore, the first to the last aggregated graph attention networks 134a'-134t' focus on less and less number of the nodes/candidate regions. For example, the input text 111 is supposed to be "Woman in pure black dress", sine the nodes of the first aggregated GAT 134a' has not been removed, the output thereof includes candidate regions for all the objects. The second aggregated GAT 134b has been removed a portion of nodes ranking in the behind (such as, the nodes corresponding to a portion of the candidate regions which mark the chopsticks has lower scores), and the other node corresponding to the other candidate regions with the higher scores are remained. The third aggregated GAT 134c has been further removed a portion of nodes ranking in the behind (such as, nodes corresponding to a portion of the candidate regions which mark the dishes has lower scores), in order to focus on the candidate regions with high scores (such as, nodes corresponding to a portion of the candidate regions which mark the humans).

Reference is made to table 1. Table 1 is to illustrate matching accuracy of the neural network architecture 100 when the target regions are marked by ground-truth objects and/or detected objects according to some embodiments.

TABLE 1

| Model | Backbone | RefCOCO | | | RefCOCO+ | | | RefCOCOg | |
|---|---|---|---|---|---|---|---|---|---|
| | | VAL | TESTA | TESTB | VAL | TESTA | TESTB | VAL | TEST |
| ECMGANs | VGG16 | 84.00 | 84.96 | 85.00 | 71.16 | 74.58 | 64.57 | 76.09 | 76.26 |
| ECMGANs + GNE | VGG16 | 84.53 | 85.56 | 85.75 | 71.48 | 75.74 | 65.13 | 76.79 | 77.24 |
| ECMGANs | ResNet101 | 86.83 | 86.18 | 85.57 | 75.08 | 79.75 | 70.16 | 79.93 | 80.04 |
| ECMGANs + GNE | ResNet101 | 87.05 | 87.08 | 86.03 | 75.52 | 80.62 | 70.43 | 80.76 | 80.79 |

In some embodiments, the present disclosure utilize the database of RefCOCO, RefCOCO+ and RefCOCOg to train the neural network architecture 100, wherein the validation set at the training stage is expressed by "VAL". After the training stage, the test set for evaluating the model is expressed by "TESTA" and "TESTB". The object detection network 120 corresponds to the said backbone, such as, VGG16 or ResNet101.

In the embodiments of Table 1, the enhanced cross-modal graph attention network 130 is expressed by "ECMGANs+ GEN", the "GEN" therein is to represent the graph node erase techniques. Compare to the other enhanced cross-modal graph attention networks without the graph node erase techniques, the enhanced cross-modal graph attention network 130 with the graph node erase techniques has the better accuracy.

Reference is made to Table 2. Table 2 is to illustrate matching accuracy of the neural network architecture 100 when the target regions are marked by detected objects according to some embodiments.

TABLE 2

| Model | Backbone | RefCOCO | | RefCOCO+ | | RefCOCOg |
| --- | --- | --- | --- | --- | --- | --- |
| | | TESTA | TESTB | TESTA | TESTB | TEST |
| ECMGANs | VGG16 | 78.02 | 66.24 | 69.26 | 51.29 | 62.07 |
| ECMGANs + GNE | VGG16 | 79.53 | 71.56 | 70.75 | 52.58 | 75.12 |
| ECMGANs | ResNet101 | 81.85 | 80.58 | 73.05 | 58.74 | 70.13 |
| ECMGANs + GNE | ResNet101 | 83.08 | 81.39 | 74.95 | 60.68 | 71.75 |

In the embodiments of Table 2, the enhanced cross-modal graph attention network 130 is expressed by "ECMGANs+GEN", the "GEN" therein is to represent the graph node erase techniques. Compare to the other enhanced cross-modal graph attention networks without the graph node erase techniques, the enhanced cross-modal graph attention network 130 with the graph node erase techniques has the better accuracy.

Reference is made to Table 3. Table 3 is to illustrate the performance of the neural network architecture 100 under different conditions.

TABLE 3

| Number of Strong Nodes | Removed Ratio of nodes | RefCOCO | | RefCOCO+ | | RefCOCOg |
| --- | --- | --- | --- | --- | --- | --- |
| | | TESTA | TESTB | TESTA | TESTB | TEST |
| (1/2)N | 30% | 83.69 | 83.56 | 73.89 | 63.03 | 75.36 |
| (1/3)N | 0% | 84.96 | 85.00 | 74.58 | 64.57 | 76.26 |
| (1/3)N | 10% | 85.21 | 84.98 | 74.74 | 64.99 | 76.73 |
| (1/3)N | 20% | 85.80 | 85.68 | 75.04 | 64.68 | 77.06 |
| (1/3)N | 30% | 85.56 | 85.75 | 75.12 | 65.13 | 77.24 |
| (1/3)N | 40% | 84.86 | 85.05 | 74.78 | 64.89 | 76.72 |
| (1/4)N | 30% | 83.42 | 83.69 | 73.16 | 63.67 | 75.10 |

In the embodiments of Table 3, the number of the strong nodes is set at (½)N, (⅓)N or (¼)N, the "N" thereof is to express the number of all the nodes. And, a ratio to remove the nodes included in the graph attention networks 135 in each reasoning step of the second to the last reasoning steps is set at 0%, 10%, 20%, 30% or 40%.

In this case, compare to the number of the strong nodes being set at (½)N, the number of the strong nodes being set at (⅓)N results in a higher accuracy of the neural network architecture 100.

And, under the condition that the test set TESTA of the database RefCOCO is used to test, when the number of the strong nodes is set at (⅓)N, and the removed ratio of nodes is set at 20%, the neural network architecture 100 has the highest accuracy. Under the condition that the test set TESTB of the database RefCOCO is used to test, when the number of the strong nodes is set at (⅓)N, and the removed ratio of nodes is set at 30%, the neural network architecture 100 has the highest accuracy.

Under the condition that the test sets TESTA and TESTB of the database RefCOCO+ and RefCOCOg are used to test, when the number of the strong nodes is set at (⅓)N, and the removed ratio of nodes is set at 30%, the neural network architecture 100 has the highest accuracy. Therefore, the number of the strong nodes of the enhanced cross-modal graph attention network 130 can be set at (⅓)N, and the removed ratio of nodes is set at 30%, in order to increase the accuracy.

For example, the first aggregated graph attention network 134a' includes N nodes. In the second reasoning step, 30% nodes with the scores ranking in the behind are removed from the first aggregated graph attention network 134a' to generate a first sub-graph attention network 334a as a second graph attention network 134b. That is, the number of all the nodes of second graph attention network 134b is 0.7 N. In the second reasoning step, the second graph attention network 134b is aggregated to generate a second aggregated graph attention network 134b' included 0.7 N nodes, and the number of the compound features $m_1^{(2)} \sim m_{n_2}^{(2)}$ of the second aggregated graph attention network 134b' is also 0.7 N.

And, in the third reasoning step, 30% nodes with the scores ranking in the behind are removed from the second aggregated graph attention network 134b' to generate a second sub-graph attention network 334b as a third graph attention network 134c. That is, the number of all the nodes of third graph attention network 134c is 0.7 N*0.7 N.

Reference is made to Table 4. Table 4 is to illustrate the performance of the neural network architecture 100 with different numbers of the reasoning steps.

TABLE 4

| Number of reasoning step | RefCOCO | | RefCOCO+ | | RefCOCOg |
| --- | --- | --- | --- | --- | --- |
| | TESTA | TESTB | TESTA | TESTB | TEST |
| 0 | 80.69 | 81.56 | 71.89 | 61.03 | 73.36 |
| 1 | 83.42 | 83.69 | 73.16 | 64.67 | 76.10 |
| 2 | 85.42 | 84.66 | 75.06 | 65.85 | 76.89 |
| 3 | 85.56 | 85.675 | 75.12 | 65.13 | 77.24 |
| 4 | 84.23 | 85.68 | 75.04 | 64.68 | 77.06 |

Compare to the number of the reasoning steps equal to 0 (which is, the aggregation of nodes are not being perform), the number of the reasoning steps larger than 0 (which is, the process of aggregation of nodes are performed at least one time) results in the higher accuracy of the neural network architecture 100.

And, when the number of the reasoning steps equal to 3 (such as, the third aggregated graph attention network 134c' is output as a last aggregated graph attention network), the neural network architecture 100 has better accuracy under different database. In some embodiments, the number of the reasoning steps is set to be equal to 3, in order to increase accuracy and to avoid vanishing gradient which may result in over-fitting. In some embodiments, the compound feature of the i-th node of the last aggregated graph attention network can be implemented by $m_i^{(3)}$.

Figure 7:
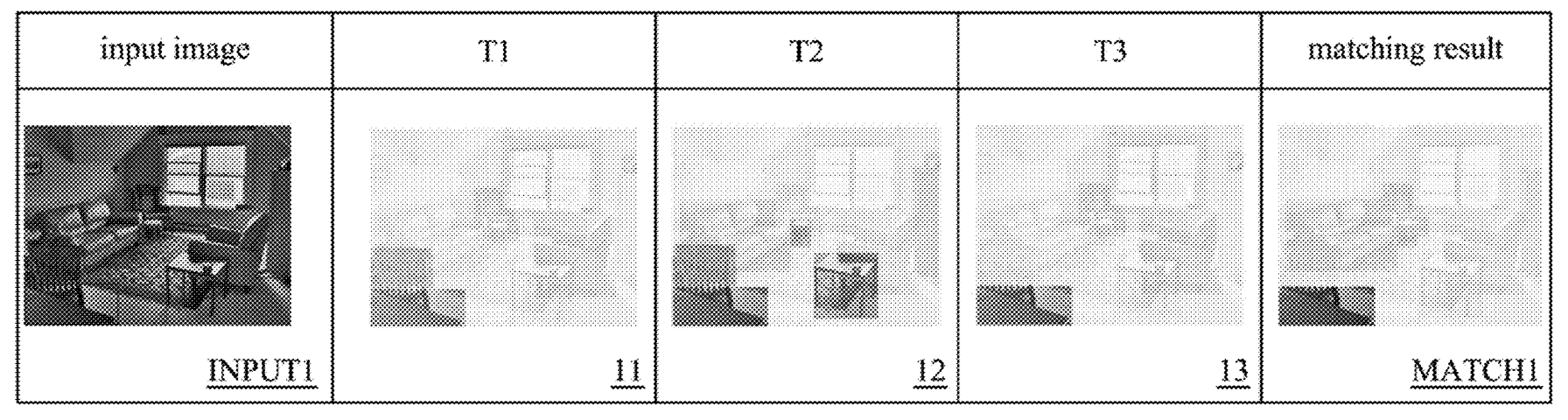

Reference is made to FIG. 7. FIG. 7 is a schematic diagram illustrating outcomes of the neural network architecture 100 configured with different numbers of reasoning steps according to some embodiments of the present disclosure. When the input text 111 is "table next to wooden chair", the text recognition network 110 extracts "table", "wooden chair" as the entity feature and extracts "next to" as the relation feature.

When the input image INPUT1 includes multiple objects (such as, chairs, sofas, windows, a carpet and tables), the object detection network 120 detects candidate regions of each of the objects and detects the classifications of the objects in the candidate regions, so as to generate the visual feature of each candidate regions.

The enhanced cross-modal graph attention network 130 generate the corresponding detected result according to the textual feature (such as, "table" and "wooden chair" of the entity feature and "next to" of the relation feature) output from the text recognition network 110 and visual features and spatial locations output from the object detection network 120.

Specifically, when the first reasoning step T1 is completed, a table closest to a chair has a highest score (candidate regions with high to low scores represented by high to low grayscale) in the detected results 11 of the neural network architecture 100.

When the first reasoning step T1 is completed, a table closest to a sofa has a highest score (candidate regions with high to low scores represented by high to low grayscale) in the detected results 12 of the neural network architecture 100.

When the first reasoning step T3 is completed, the table closest to the chair has a highest score (candidate regions with high to low scores represented by high to low grayscale) in the detected results 13 of the neural network architecture 100, which is the same with the matching result MATCH1.

Figure 8:
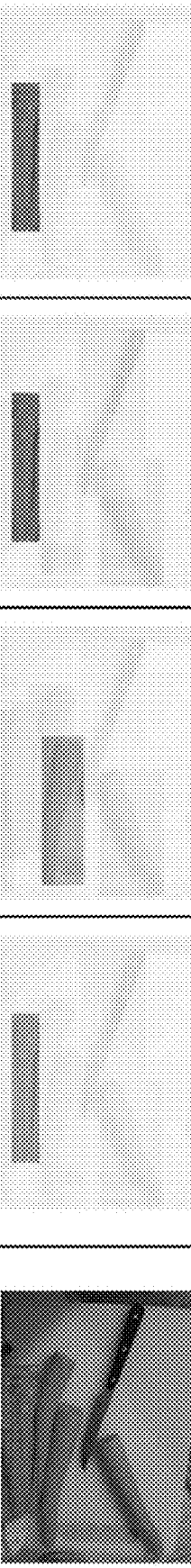
FIG. 8 is a schematic diagram illustrating outcomes of the neural network architecture configured with different numbers of multiple reasoning steps according to some embodiments of the present disclosure.

Reference is made to FIG. 8. FIG. 8 is a schematic diagram illustrating outcomes of the neural network architecture 100 configured with different numbers of multiple reasoning steps according to some embodiments of the present disclosure. When the input text 111 is "carrot under warp closest to carrot not under warp", the text recognition network 110 extracts the entity feature with information of "carrot" and "warp" appeared earlier and "carrot" and "warp" appeared latter, and the text recognition network 110 extracts the relation feature with information of "under", "closest to" "not under".

If the input image INPUT2 includes multiple objects (such as, Carrots, paring knives, cutting boards and bags), the object detection network 120 detects candidate regions of each of the objects and detects the classifications of the objects in the candidate regions, so as to generate the visual feature of each candidate regions.

The enhanced cross-modal graph attention network 130 generate the corresponding detected result according to the textual feature (such as, "carrot" and "warp" appeared earlier and "carrot" and "warp" appeared latter of which are extracted as the entity feature and "under", "closest to" "not under" which are extracted as the relation feature) output from the text recognition network 110 and visual features and spatial locations output from the object detection network 120.

Specifically, when the first reasoning step T1 is completed, a carrot inside a plastic bag has a highest score (candidate regions with high to low scores represented by high to low grayscale) in the detected results 21 of the neural network architecture 100.

When the first reasoning step T2 is completed, a carrot outside a plastic bag has a highest score (candidate regions with high to low scores represented by high to low grayscale) in the detected results 22 of the neural network architecture 100.

When the first reasoning step T3 is completed, a carrot inside a plastic bag has a highest score (candidate regions with high to low scores represented by high to low grayscale) in the detected results 23 of the neural network architecture 100, which is the same with the matching result MATCH2.

Figure 9:
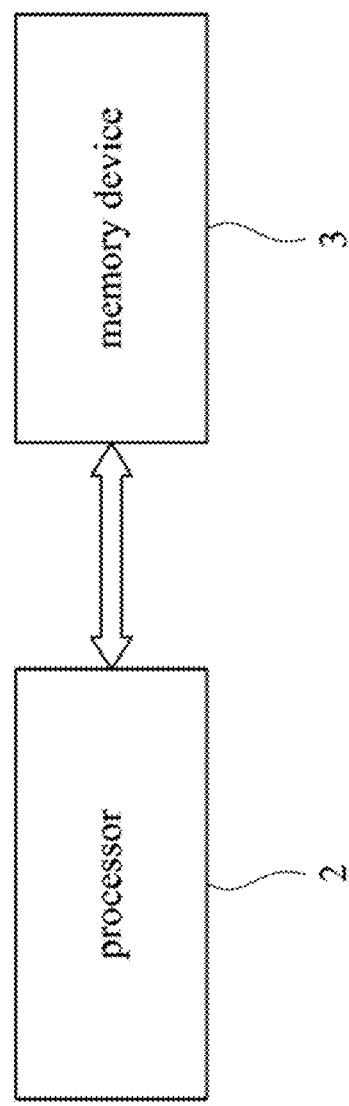
FIG. 9 is a schematic diagram illustrating an electronic device according to some embodiments of the present disclosure.

Reference is made to FIG. 9 to FIG. 9. FIG. 9 is a schematic diagram illustrating an electronic device 1 according to some embodiments of the present disclosure. As s shown in FIG. 9, the electronic device 1 includes a processor 2 and a memory device 3.

The processor 2 can be implemented by a central processing unit, a microprocessor, a graphics processing unit, a programmable gate array integrated circuit (FPGA), an application specific integrated circuit (ASIC) or other suitable hardware device that capable for executing instructions stored in the memory device 3. The processor 2 is electrically coupled to the memory device 3.

The memory device 3 can be implemented by electrical, magnetic, optical memory devices or other storage devices for storing instructions or data. The memory device 3 can be implemented by volatile memory or non-volatile memory. In some embodiments, the memory device 3 can be composed of random access memory (RAM), dynamic random access memory (DRAM), magnetoresistive random access memory (MRAM), Phase-Change Random Access Memory (PCRAM) or other storage devices. The memory device 3 is configured to store data or instructions for the processor 2 to access and operate.

In some embodiments, the neural network architecture 100 and training data and/or test data can be stored in the memory device 3 for the processor 2 to access and execute step S410-S470 in the recognition method 400, in order to recognize a target region which matches the expression of the input text 111.

Summary, the neural network architecture 100 of the present disclosure includes the text recognition network 110, the object detection network 120 and the enhanced cross-modal graph attention network 130. The neural network architecture 100 matches the entity feature extracted from each individual word and relation feature to the node features and the edge aggregated features generated by the enhanced cross-modal graph attention network 130 to generate the first scores, and the neural network architecture 100 matches the overall feature extracted from whole input text 11 to the compound feature generated by the enhanced cross-modal graph attention network 130 to generate the second scores, so as to enhance the matching accuracy between the expression of the text and the target region in the image according to the first scores and the second scores. And, the neural network architecture 100 eliminates the effect of irrelevant object on the target object, so as to increase accuracy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A recognition method, comprising:
analyzing a text to generate an entity feature, a relation feature and an overall feature by a text recognition network;
analyzing an input image to generate a plurality of candidate regions by an object detection network;
generating a plurality of node features, a plurality of aggregated edge features and a plurality of compound features according to the entity feature, the relation feature, the candidate regions and the overall feature by an enhanced cross-modal graph attention network;
matching the entity feature and the relation feature to the node features and the aggregated edge features to generate a plurality of first scores;
matching the overall feature to the compound features to generate a plurality of second scores; and
generating a plurality of final scores corresponding to the candidate regions according to the first scores and the second scores,
wherein the recognition method further comprises:
generating an initial graph attention network according to the candidate regions by the enhanced cross-modal graph attention network;
classifying a plurality of nodes corresponding to the candidate regions into a plurality of strong nodes and a plurality of weak nodes according to areas of the candidate regions; and
updating the initial graph attention network according to the strong nodes and the weak nodes to generate an initial updated graph attention network,
wherein the recognition method further comprises:
updating the initial updated graph attention network according to the entity feature and the relation feature to generate a first graph attention network,
wherein the recognition method further comprises:
performing a multi-step reasoning operation on the first graph attention network according to the overall feature to generate a last aggregated graph attention network; and
generating the compound features by the last aggregated graph attention network,
wherein the step of performing the multi-step reasoning operation on the first graph attention network comprising a plurality of reasoning steps, wherein the recognition method in each of the reasoning steps comprises:
receiving a previous aggregated graph attention network;
removing a portion of the nodes included in the previous aggregated graph attention network with lower scores to generate a current graph attention network; and
performing an aggregation process on the current graph attention network according to the overall feature to generate a current aggregated graph attention network.

2. The recognition method of claim 1, wherein the step of performing the multi-step reasoning operation on the first graph attention network comprises a plurality of reasoning steps, wherein the recognition method in each of the reasoning steps further comprises:

if the current aggregated graph attention network is not the last aggregated graph attention network, outputting the current aggregated graph attention network to a next reasoning step; and
if the current aggregated graph attention network is the last aggregated graph attention network, outputting the current aggregated graph attention network as the last aggregated graph attention network to generate the compound features.

3. The recognition method of claim 1, further comprising:
selecting a target region corresponding an expression of the text from the candidate regions of the input image according to the final scores.

4. The recognition method of claim 3, further comprising:
determining whether the final scores exceed a threshold; and
if one of the final scores exceeds the threshold, determining one of the candidate regions corresponding to the one of the final scores as the target region.

5. The recognition method of claim 3, further comprising:
selecting a highest score from the final scores;
determining one of the candidate regions corresponding to the highest score as the target region; and
calculating a loss function according to the target region and a real-truth region of the input image corresponding to the text to update weights of the enhanced cross-modal graph attention network according to the loss function.

6. The recognition method of claim 1, further comprising:
matching the entity feature to the node features to generate a plurality of entity scores;
matching the relation feature to the aggregated edge features to generate a plurality of relation scores; and
generating the first scores according to the entity scores and the relation scores.

7. An electronic device, comprising:
a memory device; and
a processor, electrically coupled to the memory device, and wherein the processor is configured to:
analyze a text to generate an entity feature, a relation feature and an overall feature based on a text recognition network;
analyze an input image to generate a plurality of candidate regions based on an object detection network;
generate a plurality of node features, a plurality of aggregated edge features and a plurality of compound features according to the entity feature, the relation feature, the candidate regions and the overall feature based on an enhanced cross-modal graph attention network;
match the entity feature and the relation feature to the node features and the aggregated edge features to generate a plurality of first scores;
match the overall feature to the compound features to generate a plurality of second scores; and
generate a plurality of final scores corresponding to the candidate regions according to the first scores and the second scores,
wherein the processor is further configured to:
generate an initial graph attention network according to the candidate regions based on the enhanced cross-modal graph attention network;
classify a plurality of nodes corresponding to the candidate regions into a plurality of strong nodes and a plurality of weak nodes according to areas of the candidate regions; and update the initial graph attention network according to the strong nodes and the weak nodes to generate an initial updated graph attention network, wherein the processor is further configured to:
update the initial updated graph attention network according to the entity feature and the relation feature to generate a first graph attention network, wherein the processor is further configured to:
perform a multi-step reasoning operation on the first graph attention network according to the overall feature to generate a last aggregated graph attention network; and
generate the compound features by the last aggregated graph attention network, wherein the step of performing the multi-step reasoning operation on the first graph attention network comprises a plurality of reasoning steps, wherein in each of the reasoning steps, the processor is further configured to:
receive a previous aggregated graph attention network;
remove a portion of the nodes included in the previous aggregated graph attention network with lower scores to generate a current graph attention network; and
perform an aggregation process on the current graph attention network according to the overall feature to generate a current aggregated graph attention network.

8. The electronic device of claim 7, wherein the step of performing the multi-step reasoning operation on the first graph attention network comprises a plurality of reasoning steps, wherein in each of the reasoning steps, the processor is further configured to:
if the current aggregated graph attention network is not the last aggregated graph attention network, output the current aggregated graph attention network to a next reasoning step; and
if the current aggregated graph attention network is the last aggregated graph attention network, output the current aggregated graph attention network as the last aggregated graph attention network to generate the compound features.

9. The electronic device of claim 7, wherein the processor is further configured to:
select a target region corresponding the an expression of the text from the candidate regions of the input image according to the final scores.

10. The electronic device of claim 9, wherein the processor is further configured to:
determine whether the final scores exceed a threshold; and
if one of the final scores exceeds the threshold, determine one of the candidate regions corresponding to the one of the final scores as the target region.

11. The electronic device of claim 9, wherein the processor is further configured to:
select a highest score from the final scores;
determine one of the candidate regions corresponding to the highest score as the target region; and
calculate a loss function according to the target region and a real-truth region of the input image corresponding to the text to update weights of the enhanced cross-modal graph attention network according to the loss function.

12. The electronic device of claim 7, wherein the processor is further configured to:
match the entity feature to the node features to generate a plurality of entity scores;
match the relation feature to the aggregated edge features to generate a plurality of relation scores; and
generate the first scores according to the entity scores and the relation scores.

* * * * *